US006981119B1

(12) United States Patent
Lepak et al.

(10) Patent No.: US 6,981,119 B1
(45) Date of Patent: Dec. 27, 2005

(54) SYSTEM AND METHOD FOR STORING PERFORMANCE-ENHANCING DATA IN MEMORY SPACE FREED BY DATA COMPRESSION

(75) Inventors: Kevin Michael Lepak, Madison, WI (US); Benjamin Thomas Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 310 days.

(21) Appl. No.: 10/230,925

(22) Filed: Aug. 29, 2002

(51) Int. Cl.[7] ............................................. G06F 12/00

(52) U.S. Cl. ....................... 711/170; 711/118; 711/129; 711/134; 711/173; 710/68

(58) Field of Search ........................ 711/170, 173, 118, 711/129, 134; 710/68

(56) References Cited

U.S. PATENT DOCUMENTS

| | | | | |
|---|---|---|---|---|
| 5,812,817 | A | 9/1998 | Hovis et al. | |
| 5,974,471 | A | 10/1999 | Belt | |
| 6,145,069 | A | 11/2000 | Dye | |
| 6,170,047 | B1 | 1/2001 | Dye | |
| 6,173,381 | B1 | 1/2001 | Dye | |
| 6,208,273 | B1 | 3/2001 | Dye et al. | |
| 6,324,621 | B2 * | 11/2001 | Singh et al. | 711/129 |
| 6,370,631 | B1 | 4/2002 | Dye | |

OTHER PUBLICATIONS

"Effective Jump-Pointer Prefetching for Linked Data Structures," Roth, et al., Computer Science Dept., Univ. of Wisconsin, Madison, May 1999, 18 pages.

"Frequent Value Compression in Data Caches," Yang et al., Dept. of Computer Science, Univ. of Arizona, Tuscon, Jun. 2000, 10 pages.

"Push vs. Pull: Data Movement for Linked Data Structures," Chia-Lin Yang et al., International Conference on Supercomputing, May 2000, 11 pages.

Memory-Side Prefetching for Linked Data Structures, Christopher Hughes, et al., Dept. of Computer Science, Univ. of Illinois at Urbana-Campaign, UIUC CS Technical Report UIUCDCS-R-2001-2221, May 2001, 25 pages.

"MLP yes! ILP no!," Memory Level Parallelism, or why I no longer care about Instruction Level Parallelism, Andrew Glew, Intel Microcopmuter Research Lbas and University of Wisconsin, Oct. 98, 10 pages.

"IBM Memory Expansion Technology (MXT)," R. B. Termaine, et al., IBM J. RES. & DEV., vol. 45, No. 2, Mar. 2001, 15 pages.

"Research Report: On Management of Free Space in Compressed Memory Systems," Peter Franaszek, et al., IBM Research Division, Oct. 22, 1998, 21 pages.

(Continued)

*Primary Examiner*—Mano Padmanabhan
*Assistant Examiner*—Mehdi Namazi
(74) *Attorney, Agent, or Firm*—Robert C. Kowert; Meyertons, Hood, Kivlin, Kowert & Goetzel, P.C.

(57) ABSTRACT

A memory system may use the storage space freed by compressing a unit of data to store performance-enhancing data associated with that unit of data. For example, a memory controller may be configured to allocate several of storage locations within a memory to store a unit of data. If the unit of data is compressed, the unit of data may not occupy a portion of the storage locations allocated to it. The memory controller may store performance-enhancing data associated with the unit of data in the portion of the storage locations allocated to but not occupied by the first unit of data.

33 Claims, 7 Drawing Sheets

OTHER PUBLICATIONS

"On Internal Organization in Compressed Random-Access Memories," P.A. Franaszek, et al., IBM J. RES. & DEV. vol. 45, No. 2, Mar. 2001, 12 pages.

"Memory expansion Architecture (MXT) Support," http://www-123.ibm.com/mxt/publications/mxt.txt, Bulent Abali, Oct. 24, 200111 pages.

* cited by examiner

SYSTEM AND METHOD FOR STORING PERFORMANCE-ENHANCING DATA IN MEMORY SPACE FREED BY DATA COMPRESSION

BACKGROUND OF THE INVENTION

1. Field of the Invention

This invention relates to computer systems and, more particularly, to using data compression on data stored in dynamic random access memory in order to free space for storing performance-enhancing data.

2. Description of the Related Art

Memory often constitutes a significant amount of the cost of a computer system. However, the data stored within memory in a computer system is very compressible. Compressing data within memory is an attractive way of reducing memory cost since the effective size of a memory device can be increased if data compression is used. However, the complexities associated with managing compressed memory have limited the use of compression.

Data compression generally cannot compress different sets of data to a uniform size. For example, one page of data may be highly compressible (e.g., to less than 25% of its original size) while another page may only be slightly compressible (e.g., to 90% of its original size). As a result, one complexity that arises when managing memory that stores compressed data results from having to track sets of data that may each have variable lengths. In order to be able to access specific units of data in such a memory system, directory structures are used to track where each compressed unit of data is currently stored. However, these directory structures, which are typically stored in memory, add increased memory controller complexity, take up space in memory, and increase access times since an access to the directory is often necessary in order to be able to access the requested data.

Another potential problem with storing compressed data in memory arises because data may become less compressible over time. For example, if a cache line is compressed, there is a risk that a subsequent modification will change the data in that cache line such that it can no longer be compressed to fit within the space allocated to it, resulting in data overflow. This in turn may lead to incorrectness if there is no way to restore the data lost to the overflow. One proposed method of dealing with this problem involves both deallocating and reallocating space to a unit of data each time that data is modified. Implementing such a method increases memory controller complexity.

Another concern faced by system designers involves the increasing performance gap between memory and microprocessors. Microprocessor clock frequencies and issue rates (i.e., the rate at which instructions begin executing within the microprocessor) continue to improve more quickly than memory bandwidth is increasing. In terms of access latency (i.e., the time required for memory to respond to a memory access request), memory performance is also not increasing as rapidly as microprocessor capabilities. In some cases, memory latency is actually increasing with respect to microprocessor clock cycles. Accordingly, it is desirable to decrease the effective performance gap between memory and microprocessors.

One way in which the effects of the performance gap may be reduced is by prefetching data (e.g., application data and/or program code) from memory into a cache that has lower latency than the memory. The data may be prefetched while the microprocessor is operating on other data. The prefetch is typically initiated early enough so that the prefetched data is available in the cache just before the microprocessor is ready to begin operating on the prefetched data. So long as the processor is primarily operating on data that has already been prefetched into the cache, the processor will spend less time waiting for memory accesses to complete, despite the memory's slower access latency and lower bandwidth.

It is desirable to be able to use data compression and/or prefetching techniques in order to reduce the effective cost of memory and/or the effects of the performance gap between memory and microprocessors.

SUMMARY

Various embodiments of a computer system may be configured to store performance-enhancing data associated with a unit of data in the memory space freed by compressing that unit of data. In one embodiment, a system may include a performance enhancement unit configured to generate performance-enhancing data associated with a unit of data and a memory controller coupled to the performance enhancement unit. The memory controller may be configured to allocate several storage locations within the memory to store the unit of data. If the unit of data is compressed, the unit of data may not occupy a portion of the storage locations allocated to it. The memory controller stores the performance-enhancing data associated with the unit of data in the portion of the storage locations allocated to but not occupied by the unit of data. Even though some of the data stored within the memory is compressed, the memory may still be accessible as a set of constant-length units of data in many embodiments.

The memory controller may be configured to overwrite the performance-enhancing data with a less-compressible version of the unit of data in response to the unit of data becoming less compressible. The memory controller may copy the performance-enhancing data to another set of storage locations before overwriting it.

In some embodiments, the memory controller may allocate the same number of storage locations to both compressed and uncompressed units of data. The number of storage locations allocated to each may be equal to the number of storage locations occupied by an uncompressed unit of data.

In one embodiment, the performance-enhancing data may be stored in compressed form within the memory. The performance-enhancing data may include prefetch data (such as a jump-pointer) that may be used to request another unit of data from the memory in response to the first unit of data being accessed. The performance-enhancing data may be available at the same granularity (e.g., on a cache line basis) as the granularity of data on which data compression is performed in some embodiments.

The system may also include a mass storage device and a decompression unit that decompresses units of data written from the memory to the mass storage device. In alternative embodiments, units of data that are compressed in the memory may be stored in compressed form on the mass storage device. In such embodiments, the performance-enhancing data associated with the compressed units of data may also be stored on the mass storage device. A compression unit may be included to compress units of data written to the memory from the mass storage device.

A functional unit configured to operate on the first unit of data may request the unit of data from the memory. In response, the memory controller may cause the memory to output the unit of data and the performance-enhancing data. The decompression unit may receive the first unit of data from the memory and decompress the first unit of data before providing the decompressed data to the functional unit. If the performance-enhancing data is compressed, the decompression unit may also decompress the performance-enhancing data. If the performance-enhancing data includes prefetch data, the memory controller may use the prefetch data to initiate a prefetch of another unit of data from memory.

One embodiment of a method may involve compressing an uncompressed unit of data into a compressed unit of data, which frees a portion of the memory space required to store the uncompressed unit of data, and storing performance-enhancing data associated with the compressed unit of data in the freed portion of the memory space. The method may also involve overwriting the performance-enhancing data stored in the freed portion of the memory space with the compressed unit of data in response to the compressed unit of data becoming less compressible.

BRIEF DESCRIPTION OF THE DRAWINGS

A better understanding of the present invention can be obtained when the following detailed description is considered in conjunction with the following drawings, in which.

Figure 1:
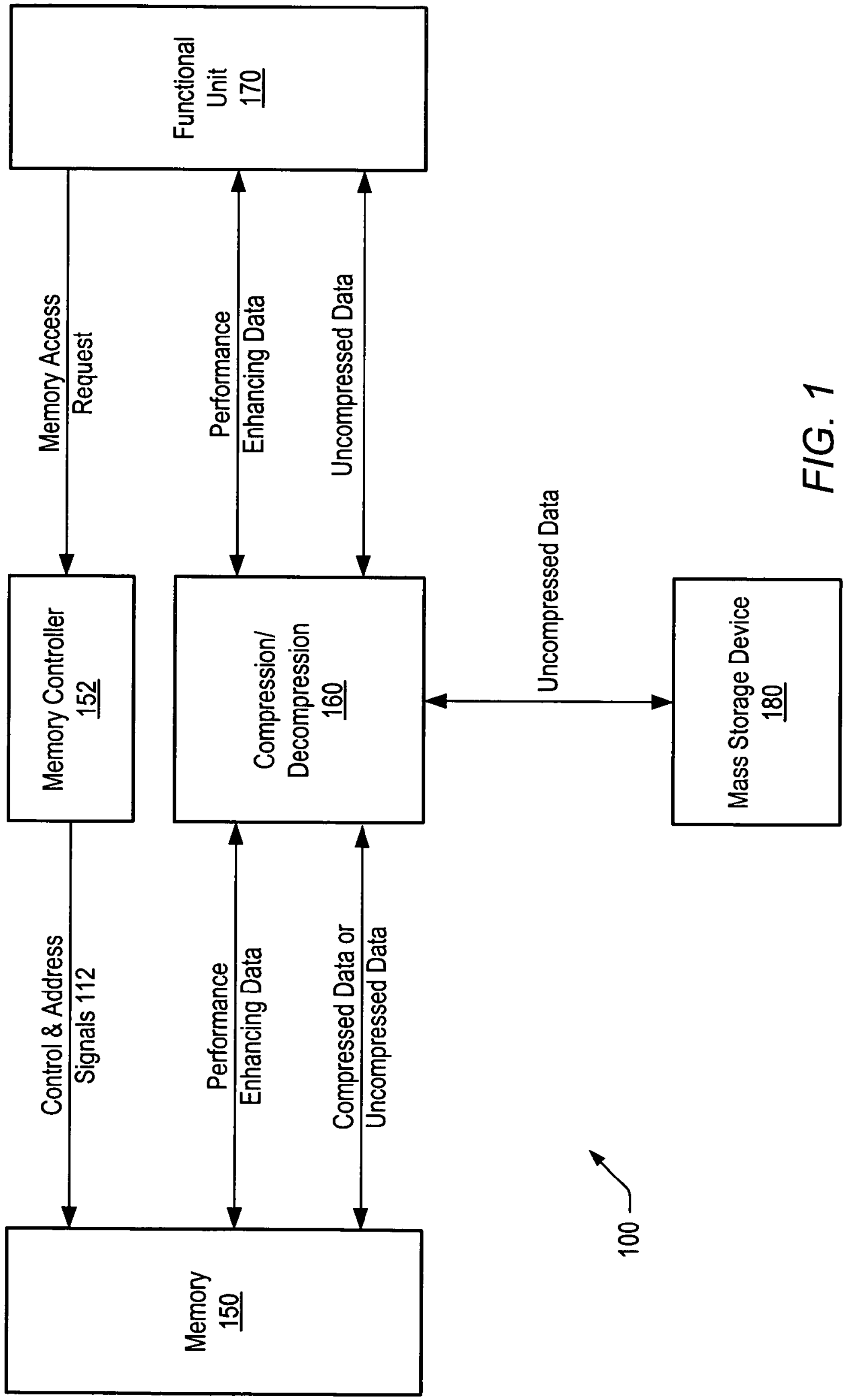
FIG. 1 shows a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one embodiment of a computer system 100 in which memory space freed by data compression is used to store performance-enhancing data associated with the compressed data. As shown in FIG. 1, a computer system 100 may include one or more memories 150, one or more memory controllers 152, one or more compression/decompression units 160, one or more functional units 170, and/or one or more mass storage devices 180.

Memory 150 may include one or more DRAM devices such as DDR SDRAM (Double Data Rate Synchronous DRAM), VDRAM (Video DRAM), RDRAM (Rambus DRAM), etc. Memory 150 may be configured as a system memory or a memory for a specialized subsystem (e.g., a dedicated memory on a graphics card). All or some of the application data stored within memory 150 may be stored in a compressed form. Application data includes data operated on by a program. Examples of application data include a bit mapped image, font tables for text output, information defined as constants such as table or initialization information, etc. Other types of data, such as program code, may also be stored in compressed form within memory 150. Memory 150 is an example of a means for storing data.

Memory controller 152 may be configured to receive memory access requests (e.g., address and control signals) targeting memory 150 from devices configured to access memory 150. When memory controller 152 receives a memory access request, memory controller 152 may decode a received address into an appropriate address form for memory 150. For example, in many embodiments, memory controller 152 may determine the bank, row, and column corresponding to the received address and generate signals 112 that identify that bank, row, and/or column to memory 150. Signals 112 may also identify the type of access being requested. Memory controller 152 may determine what type of signals 112 to generate based on the current state of the memory 150 and the type of access currently being requested (as indicated by the received memory access request). Signals 112 may be used to control what type of access (e.g., read or write) is performed. Signals 112 may be generated by asserting and/or deasserting various control and/or address signals. Memory controller 152 is an example of a means for controlling the storage of data within memory 150.

Compression/decompression unit 160 may be configured to compress data being written to memory 150 and to decompress data being read from memory 150. The type of data compression used to compress units of data may vary between embodiments. In general, a lossless compression mechanism is desirable so that data correctness is not affected by the compression/decompression. The granularity of data on which compression is performed may also vary. In some embodiments, the compression granularity may be constant (e.g., compression is performed on a cache line basis). In other embodiments, the granularity may vary (e.g., some data may be compressed on a cache line basis while other data may be compressed on a page basis).

Memory 150 may include multiple storage locations each configured to store a particular amount (e.g., a bit, byte, line, or block) of data. In response to a request to store data in memory 150, memory controller 152 may store the data in a number of storage locations within memory 150. For example, in one embodiment, the memory controller 152 may cause the memory 150 to perform a burst write with a particular burst length in order to store the data to memory 150. In many embodiments, the number of storage locations allocated to store a particular granularity (e.g., a cache line, a page, or a block) of data may be the same for both uncompressed and compressed units of data at that granularity. The number of storage locations may be selected so that an uncompressed unit of data can be fully stored within that number of storage locations. Since compressed data may take up fewer storage locations, there may be unused storage locations allocated to a compressed unit of data. All or some of these unused storage locations may be used to store performance-enhancing data associated with the compressed unit of data. The performance-enhancing data may itself be compressed in some embodiments.

For each unit of data, the memory controller 152 may store associated status data that indicates whether that unit of data is currently compressed in memory 150. In some embodiments, a single status bit may be used to indicate whether the unit of data is compressed or not. The status data may also include an error detecting/correcting code associated with the compressed data. In some embodiments, a flag indicating whether the unit of data is compressed may be stored using an unused error detecting/correcting code pattern. The status data may also indicate whether the storage locations allocated to the unit of data within the memory 150 contain performance-enhancing data. For example, if a unit of data is compressed but associated performance-enhancing data is not stored in the storage locations allocated to that unit of data, the status data may indicate that no performance-enhancing data is present. If performance-enhancing data is stored within the storage locations allocated to that unit of data, the status data may indicate that both data and performance-enhancing data is present. The status data may also indicate the size (e.g., in bytes) of the compressed data and/or the size of the performance-enhancing data in one embodiment. The status data may be conveyed with its associated unit of data (e.g., to compression/decompression unit 160) each time the memory 150 outputs that unit of data.

Performance-enhancing data stored with a particular unit of data may include various different types of data. For example, performance-enhancing data may include jump-pointers or other prefetch data that identifies another unit of data that is likely to be accessed soon after the particular unit of data with which it is associated is accessed. In one embodiment, prefetch data may indicate whether program control flow is likely to branch to a different location (e.g., the prefetch data may include a branch prediction indicating whether a branch instruction included in the associated compressed data will be taken or not taken). Such prefetch data may also include correlation information (e.g., if particular conditional branch is highly likely to have a particular outcome if a pattern of outcomes of that conditional branch and/or neighboring branches occurs, that pattern may be stored as correlation information for that particular conditional branch), confidence counters (e.g., counter values indicating how likely the branch prediction is to be correct), or other information that may be used to determine whether to use the prefetch data or to otherwise improve the accuracy of the prefetch data.

In some embodiments, performance-enhancing data may include non-prefetch data, such as directory information, that is associated with the compressed unit of data. For example, the performance-enhancing data may indicate whether any microprocessor in a multiprocessor system currently has the data in a particular coherence state (e.g., a Modified, Owned, Shared, or Invalid state in a MOSI coherency protocol) and, if so, which microprocessor has the compressed unit of data in that coherence state.

Some types of performance-enhancing data may enhance computer system 100's performance but not be necessary to ensure the correctness of results generated by computer system 100. Prefetch data is one such type of performance-enhancing data. If correct, prefetch data may allow pipeline stalls resulting from delays in retrieving data to be reduced and/or eliminated. However, if prefetch data is missing or incorrect, any results generated from the data that would have been prefetched will still ultimately be correct (assuming other components are functioning properly). When correctness does not depend on the performance-enhancing data, the performance-enhancing data may be overwritten if the unit of data with which it is associated becomes less compressible, allowing the less-compressible unit of data to be stored in the storage locations previously occupied by the associated performance-enhancing data. Accordingly, data loss due to overflows may be avoided in some embodiments.

Other performance-enhancing data may affect correctness. For example, in some embodiments, cache coherency information (e.g., included in a directory) may be necessary for correctness. A backup storage mechanism (e.g., a dedicated set of storage locations within memory 150 and/or mass storage device 180) may be provided to store the performance-enhancing data if the data with which it is associated is no longer able to be compressed enough to provide storage for the performance-enhancing data. In one embodiment, memory controller 152 may dynamically increase and/or decrease the amount of space within memory 150 allocated to directory information depending on how much directory information is currently stored in unused storage locations allocated to associated compressed units of data.

Accordingly, in many embodiments, using space freed by compressing a unit of data to store performance-enhancing data associated with the compressed unit of data may allow a computer system to benefit from data compression without sacrificing correctness if the same amount of compression is not attainable at a later time. Furthermore, some embodiments may allow the memory controller 152 to access memory space as a set of constant-length data units, even if some data units are compressed (i.e., no directory-type structure may be needed to indicate where variable-length compressed units of data are stored).

Note that in other embodiments, the space freed by compressing a particular unit of data (e.g., the space that would have otherwise been used to store that unit of data but for the compression) may be used to store both performance-enhancing data and all or part of another unit of data. In these embodiments, memory 150 may include one or more sets of variable length data units and a directory or lookup table may be used to identify where various units of data are located in the physical memory space. A memory controller 152 may dynamically allocate additional memory space to a unit of data if that unit of data becomes less compressible such that, even after overwriting the performance-enhancing data with a portion of the unit of data, additional memory space is still needed to store that unit of data.

The compression/decompression unit 160 may be used to ensure data is provided to other components within the computer system 100 in a usable form. In some embodiments, a functional unit 170 that operates on data stored in memory 150 may be configured to compress and/or decompress data. In such embodiments, portions of compression/decompression unit 160 may be integrated into the functional unit 170. Note that portions of compression/decompression unit 160 may also be included in other devices, such as mass storage device 180. In other embodiments, compression/decompression unit 160 may be interposed between memory 150 and functional unit 170 so that compressed data output from memory 150 can be decompressed before being provided to functional unit 170. In one such embodiment, one or more compression/decompression units 160 may be included in a bus bridge or memory controller 152.

When a compressed unit of data stored in memory 150 is read by a functional unit 170 or copied to a mass storage device 180, the compression/decompression unit 160 may decompress the data and/or remove the performance-enhancing data before providing the decompressed data to a functional unit 170 or mass storage device 180. In some embodiments, the performance-enhancing data may itself be compressed and thus the compression/decompression unit 160 may also decompress the performance-enhancing data. Note that compression/decompression unit 160 may be configured to provide the performance-enhancing data to some devices (e.g., functional unit 170) but not to others (e.g., mass storage device 180) in some embodiments.

Functional unit 170 may be a device such as a microprocessor or a graphics processor that is configured to consume and/or generate data stored in memory 150. There may be more than one such functional unit in a computer system. In some embodiments, a functional unit 170 may also be configured to detect or generate the performance-enhancing data for a particular unit of data.

Data stored in memory 150 may be copied to a mass storage device 180. Mass storage device 180 may be a component such as a disk drive or group of disk drives (e.g., a storage array), a tape drive, an optical storage device (e.g., a CD or DVD device), etc. For example, an operating system may copy pages of data into memory 150 from mass storage device 180. Modified pages may be rewritten into mass storage device 180 when they are paged out of memory 150. In some embodiments, if any components within computer system 100 cannot decompress data, data may be decompressed when it is copied from memory 150 to mass storage device 180, as shown in FIG. 1. In one embodiment, the performance-enhancing data associated with that data, if any, may be lost when the data is decompressed and stored to mass storage device 180. Accordingly, if that unit of data is copied back into memory 150 from mass storage device 180, its associated performance-enhancing data may no longer be available. If the performance-enhancing data is necessary for correctness, it may be saved in another location when the data is decompressed. For example, the performance-enhancing data may be written back to another storage location within memory 150 or to a storage location within mass storage device 180.

In other embodiments, the compressed data and the performance-enhancing data may be written to the mass storage device 180. This way, the performance-enhancing data is available if the compressed unit of data is recopied back into the memory 150 (or provided to a functional unit 170 capable of directly accessing mass storage device 180 and using the performance-enhancing data). In such embodiments, mass storage device 180 may store status data with the unit of data. The status data may indicate whether the data is currently compressed, the size of the data, and/or whether any associated performance-enhancing data is stored in the storage locations allocated to that unit of data on mass storage device 180.

Figure 2:
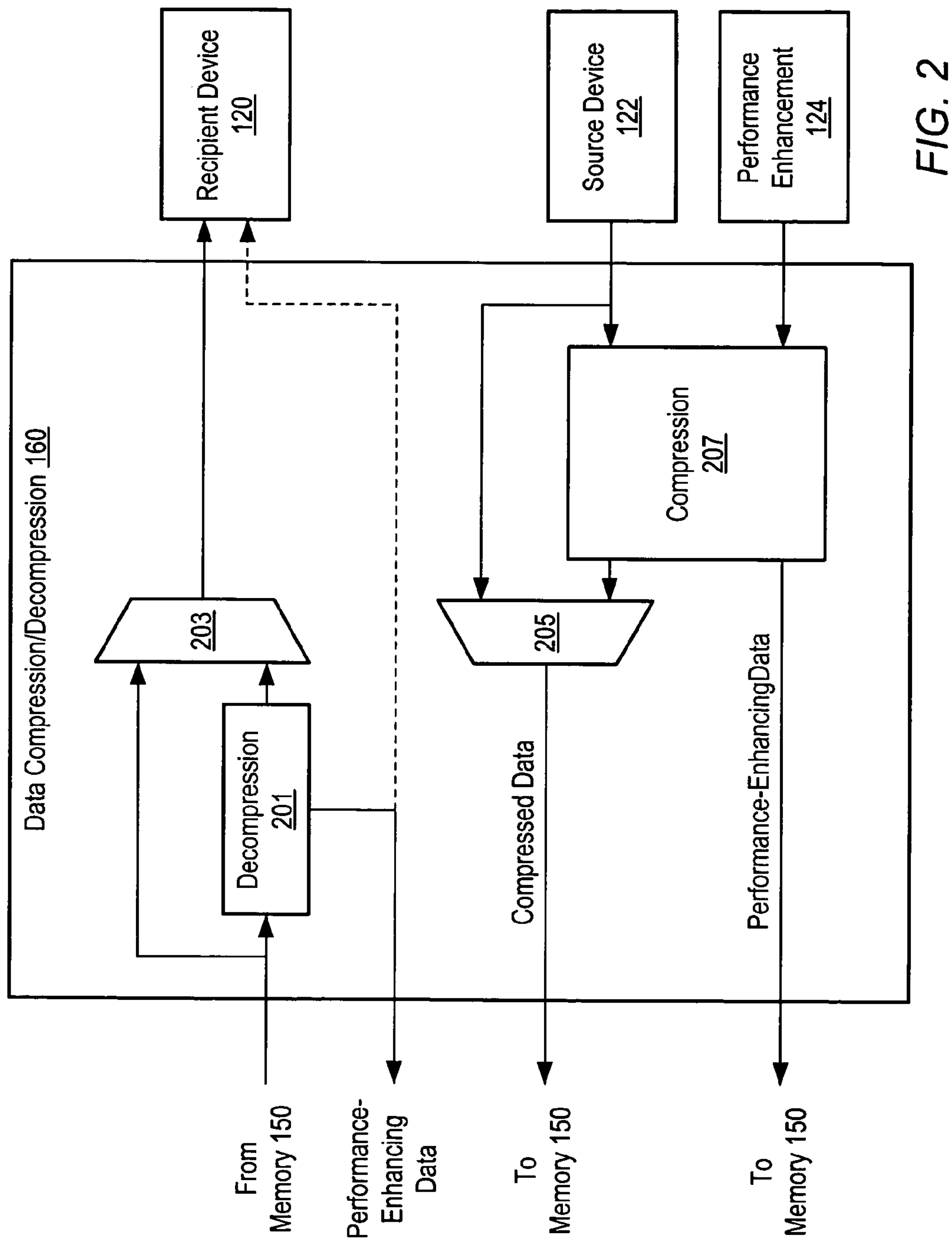
FIG. 2 illustrates one embodiment of compression/decompression unit.

FIG. 2 shows another embodiment of a computer system. This figure illustrates details of one embodiment of a compression/decompression unit 160. Compression/decompression unit 160 may be included in a memory controller 152 or a bus bridge in some embodiments. In other embodiments, portions of compression/decompression unit 160 may be distributed (or duplicated) between multiple source and/or recipient devices (e.g., some devices that provide data to memory 150 may include a compression unit 207 and some devices that receive data from memory 150 may include a decompression unit 201). In one embodiment, compression/decompression unit 160 may be included in a microprocessor.

Decompression unit 201 may be configured to decompress any compressed portions of the data received from the memory 150 and to output the requested data and the associated performance-enhancing data. If the performance-enhancing data is also compressed, decompression unit 201 may be configured to decompress that data. Depending on which device is receiving the data and the type of performance-enhancing data associated with that data, the decompression unit 201 may output all, part, or none of the performance-enhancing data to the recipient device. If the performance-enhancing data includes prefetch data identifying data that is likely to be accessed by the recipient device soon after the current data unit is accessed, the decompression unit 201 may output that prefetch data to the memory 150 as a memory read request in order to initiate the prefetch. The decompression unit 201 may also provide the prefetch data to the recipient device in some embodiments.

In some embodiments, units of data provided to decompression unit 201 may be either compressed or decompressed (i.e., some data stored within memory 150 may not be compressed in some embodiments). Accordingly, a multiplexer 203 or other selection means may be used to select whether to output the data provided by the memory 150 or the decompressed data generated by decompression unit 201 to the recipient device 120. In such embodiments, the multiplexer 203 may be controlled by a status bit included with the data provided from memory 150 that indicates whether the data is compressed.

The multiplexer 203 may also be used to select whether to provide compressed or decompressed data to the recipient device. As mentioned above, some recipient devices 120 may be configured to decompress data. The multiplexer 203 may be configured to provide compressed data to the recipient device if the recipient device 120 is configured to decompress data (or if another device interposed between decompression unit 201 and the recipient device 120 is configured to decompress data). In some embodiments, this may reduce bandwidth used for the data transfer to the recipient device 120. The multiplexer 203 may be controlled by one or more signals identifying whether the recipient device 120 is configured to decompress data.

A data compression unit 207 may be included to compress data being provided to memory 150 from a source device 122 (which may in some situations be the same device as recipient device 120). For example, if the source device 122 includes a microprocessor, the microprocessor may write modified data back to the memory 150. If the microprocessor does not compress the data, the compression unit 207 may be configured to intercept and compress the data and to provide the compressed data to the memory 150. Similarly, if the source device 122 includes a mass storage device, data copied from the mass storage device to the memory may not be compressed in some embodiments. If the data copied from the mass storage device 180 is not compressed, compression unit 207 may be configured to intercept and compress the data and to provide the compressed data to the memory 150. Selection means such as a multiplexer (not shown) may be used to select whether the data provided from the source device 122 or the compressed data generated by the compression unit 207 is provided to the memory 150. Note that decompressed data may be stored to memory 150 in some embodiments (e.g., some units of data may be uncompressible or designated as data that should not be compressed). Data compression unit 207 is an example of a means for compressing a unit of data.

Performance enhancement unit 124 may be part of a memory controller or part of a branch prediction and/or prefetch mechanism included in a microprocessor. Performance enhancement unit 124 is an example of a means for generating performance-enhancing data associated with a unit of data. Performance enhancement unit 124 may be configured to detect or generate the performance-enhancing data that is stored with compressed data in memory 150. The performance-enhancing data may be available at the same granularity as (or, in some embodiments, at a smaller granularity than) the compression granularity. For example, if compression is performed on pages of data, each unit of performance-enhancing data may be associated with a respective page of data. Similarly, if compression is performed on a cache-line basis, each unit of performance-enhancing data may be associated with a respective cache line. In other embodiments, compression may be performed on a larger granularity of data than the granularity at which performance-enhancing data is available. For example, compression may be performed on pages of data, and performance-enhancing data may be available for cache lines. In such an embodiment, the performance-enhancing data stored with a compressed page of data in memory 150 may include the performance-enhancing data for one or more of the cache lines included in that page along with indications identifying the cache line with which that unit of performance-enhancing data is associated.

In many embodiments, performance enhancement unit 124 may be included in a microprocessor that is configured to generate jump-pointers for use when accessing an LDS (Linked Data Structure) during execution of a series of program instructions. Linked data structures are common in object-oriented programming and applications that involve large dynamic data structures. LDS access is often referred to as pointer-chasing because each LDS node that is accessed typically includes a pointer to the next node to be accessed. LDS access streams tend to not have the arithmetic regularity that supports accurate arithmetic address prediction between successively accessed LDS nodes.

In order to improve performance when accessing an LDS, prefetching techniques using jump-pointers (which are also referred to as skip pointers) may be used. Each jump-pointer is associated with a particular unit of data. When that unit of data is accessed, the jump-pointer speculatively identifies the address of another unit of data to prefetch. If the jump-pointer is correct, prefetching the unit of data identified by the jump-pointer when its associated unit of data is accessed will load a subsequently-accessed unit of data into a cache by (or before) the time that the subsequently-accessed unit of data will be accessed by the microprocessor.

Performance-enhancement unit 124 may be configured to detect jump-pointers and to associate those jump-pointers with particular units of data. The performance enhancement unit 124 may output a jump-pointer (e.g., an address) to be stored in the memory 150 and an address identifying the associated unit of data to memory controller 152. If the associated unit of data has been compressed such that there are enough unused memory locations available to store the jump-pointer, the memory controller 152 may cause the memory 150 to store the jump-pointer in those unused memory locations and set any appropriate status indications for that unit of data (e.g., to indicate that performance-enhancing data is stored with that unit of data and/or to indicate which portions of that unit of data the performance-enhancing data is associated with). If the associated unit of data is not compressed, or if there are not enough unused storage locations allocated to that unit of data in which to store the jump-pointer, the memory controller 152 may not store the jump-pointer in memory 150, effectively discarding the jump-pointer.

The performance enhancement unit 124 may detect jump-pointers by detecting a cache miss (e.g., in a microprocessor's L2 cache). The address of the cache miss may be compared to those of previously detected cache misses to determine if the memory stream is striding (i.e., accessing regularly spaced units of data) or not. If the memory stream is not striding, the performance enhancement unit may determine that the address of the cache miss is a jump-pointer. Note that other embodiments may detect jump-pointers in other ways.

Once a jump pointer is detected, the performance enhancement unit 124 may associate the jump-pointer with a unit of data (e.g., another cache line). In some embodiments, the unit of data with which the jump-pointer is associated is the most-recently accessed unit of data (before the access to the unit of data pointed to by the jump-pointer). The next time the associated unit of data is accessed, the jump-pointer may be used to initiate a prefetch of the data unit to which the jump-pointer points.

In some embodiments, the performance enhancement unit 124 may associate the jump-pointer with another unit of data dependent on the load latency incurred when loading units of data (e.g., into an L2 cache) that are accessed while executing instructions that process those units of data. If the execution latency involving a unit of data is less than the load latency for a unit of data, associating a jump pointer with the most recently accessed unit of data may not provide optimum performance (e.g., memory stalls may still occur). Thus, instead of associating the jump-pointer with the most recently accessed unit of data in the data stream, the performance enhancement unit 124 may associate the jump-pointer with a unit of data accessed two or more units of data earlier. In order to identify units of data accessed earlier in the data stream, the performance enhancement unit may include a buffer (e.g., a FIFO buffer) to store the addresses of the most recently accessed units of data and to indicate the order in which those units of data were accessed. Each time a jump pointer is detected, the performance enhancement unit 124 may be configured to associate that jump pointer with the unit of data whose address is the oldest address in the buffer and to remove that address from the buffer. The address of the unit of data identified by the jump pointer may also be added to the buffer. The depth (in number of addresses) of the buffer may be adjusted based on the latency of the loop execution relative to the load latency. For example, as execution latency increases relative to load latency, the buffer depth may be decreased and vice versa.

In some embodiments, the performance enhancement unit 124 may use LRU (Least Recently Used) cache states maintained in a set-associative cache (such a cache may be included in and/or coupled to functional unit 170) to identify the data unit with which to associate a jump pointer. In such embodiments, data units may be cache lines. Within a N-way set-associative cache, there are N cache lines per cache set. Cache lines that map to the same set within the set-associative cache are said to be in the same equivalence class. A set-associative cache may implement an LRU replacement policy such that whenever a new cache line is loaded into a particular cache set, the least recently used cache line is evicted from the cache set. In order to implement an LRU replacement policy, the cache may maintain LRU states for each cache line currently cached within each cache set. The LRU states indicate the relative amount of time since each cache line was accessed (e.g., an LRU state of '0' may indicate that an associated cache line was accessed less recently than a cache line having an LRU state of '1'). The performance enhancement unit 124 may associate a jump pointer with a cache line in the same equivalence class as the cache line pointed to by the jump pointer. The performance enhancement unit 124 may select a cache line in the equivalence class based on that cache line's LRU state. For example, the performance enhancement unit 124 may associate a jump pointer with the least recently used cache line that is in the same equivalence class as the cache line pointed to by the jump pointer. In such an embodiment, the performance enhancement unit 124 may not include a separate FIFO to track the relative order in which various addresses are accessed.

If the LDS is being accessed during one or more iterations of a loop and the load latency for a unit of data is longer than the time to execute a loop iteration, jump-pointers may be associated with data units accessed in earlier loop iterations instead of being associated with data units accessed earlier in the same loop iteration. In some situations (e.g., where load latency is relatively long with respect to execution time per loop iteration), jump-pointers may be associated with data units accessed several iterations earlier. Note that other embodiments may associate jump-pointers with data units in other ways. When the associated unit of data is loaded (e.g., into an L2 cache), the jump-pointer may be used to prefetch the unit of data identified by the jump-pointer.

In embodiments where the performance-enhancing data includes a jump-pointer, the microprocessor (and its associated cache hierarchy) may not include dedicated jump-pointer storage (at least not for jump-pointers which can be stored in the memory 150). This may reduce or even eliminate the microprocessor resources that would otherwise be needed to store jump-pointers while still allowing the microprocessor to gain the performance benefits provided by the jump-pointers.

Note that in other embodiments, jump-pointers may be generated by software (e.g., by a compiler). In such embodiments, the performance enhancement unit 124 may be configured to detect the software-generated jump-pointers (e.g., in response to hint instructions detected in the program instruction stream during execution), to associate the jump pointers with the appropriate units of data, and to provide the jump-pointers to memory 150 for storage.

Performance enhancement unit 124 may detect other types of performance-enhancing data instead of (or in addition to) jump-pointers. For example, performance enhancement unit 124 may be included in a memory controller 152 and configured to detect events that update directory information. Each time the directory information for a unit of data is updated (e.g., in response to a read-to-own memory access request), the performance enhancement unit 124 may output the new directory information as well as the address of the data with which the new directory information is associated. The memory controller 152 may cause memory 150 store the new directory information in unused storage locations allocated to the associated unit of data or, if there are not enough unused storage locations available, in a set of storage locations dedicated to storing directory information.

In some embodiments, performance enhancement unit 124 may output performance-enhancing data independently of when the associated data is being written to memory 150. For example, the performance enhancement unit 124 may output the performance-enhancing data as soon as it is detected (regardless of whether the associated unit of data is currently being accessed). If the memory 150 does not currently have any memory space allocated to the associated data or if there is not enough room to store the performance-enhancing data in the memory space allocated to the associated data, the memory controller 152 may not store the performance-enhancing data.

In other embodiments, the performance enhancement unit 124 may be coordinated with a data source 122. For example, if the performance enhancement unit 124 is configured to detect prefetch data and is included in a microprocessor, the performance enhancement unit 124 may be configured to buffer the prefetch data until the cache line with which the prefetch data is associated is written back to memory 150 (or evicted from the microprocessor's L1 and/or L2 cache). The prefetch data may be written to memory 150 (and, in some embodiments; compressed) at the same time as its associated cache line.

In some embodiments, the performance-enhancing data output by performance enhancement unit 124 may be compressed before being provided to memory 150. In such embodiments, compression unit 207 may intercept and compress the performance-enhancing data and provide the compressed performance-enhancing data to the memory 150. The memory controller 152 may control the time at which the performance-enhancing data is written to memory 150 based on the availability of the compressed performance-enhancing data at the output of compression unit 207.

Figure 3:
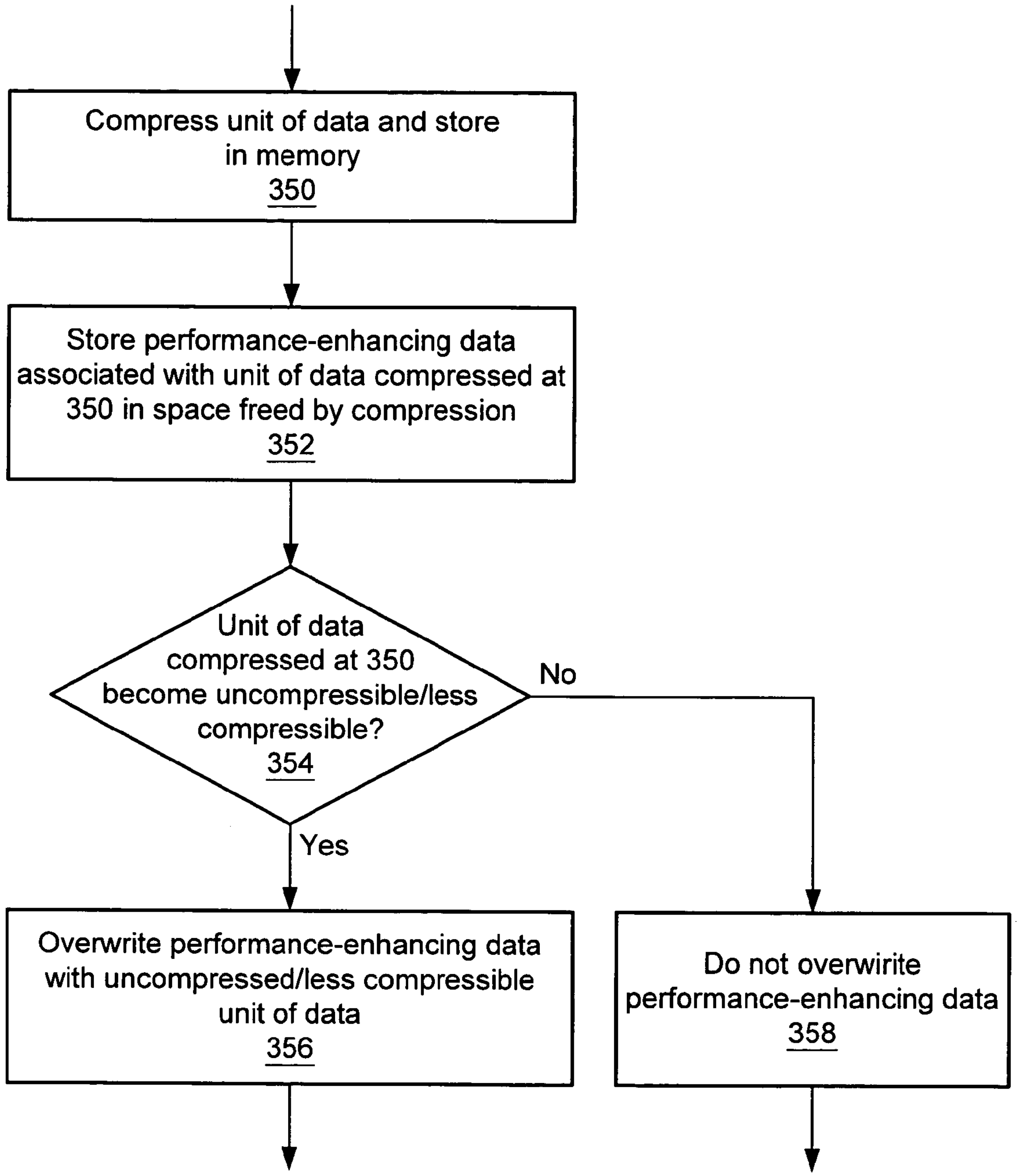
FIG. 3 is a flowchart of one embodiment of a method of operating a memory that stores compressed data.

FIG. 3 illustrates one embodiment of a method of using storage space freed by compressing a unit of data to store performance-enhancing data associated with that data. At 350, data being stored in memory is compressed. The data may be compressed on a page or cache line basis in some embodiments. A constant number of storage locations within the memory may be allocated to store the data, and thus there may be several unused storage locations within those allocated to the compressed data unit.

At 352, performance-enhancing data such as prefetch data associated with the compressed unit of data is stored in memory space freed by the data compression performed at 350. For example, the performance-enhancing data may be stored in unused storage locations allocated to a compressed unit of data with which the performance-enhancing data is associated. Performance-enhancing data may be associated with a unit of data if it identifies a current state of the associated data. For example, performance-enhancing data may include directory information that identifies the current MOSI state of a unit of data. Performance-enhancing data may also be associated with a unit of data if that performance-enhancing data provides speculative information that may be useful when the associated unit of data is accessed by a processing device. For example, the performance-enhancing data may include prefetch data or other predictive data.

If the associated unit of data becomes uncompressible or less compressible than it is at 350, the associated unit of data may overwrite the performance-enhancing data, as indicated at 354–356. If the performance-enhancing data is necessary for correctness, the performance-enhancing data may be stored elsewhere before being overwritten at 356. Otherwise, the performance-enhancing data may simply be discarded. If the unit of data does not become uncompressible or less compressible, the performance-enhancing data may not be overwritten, as indicated at 358.

Figure 4:
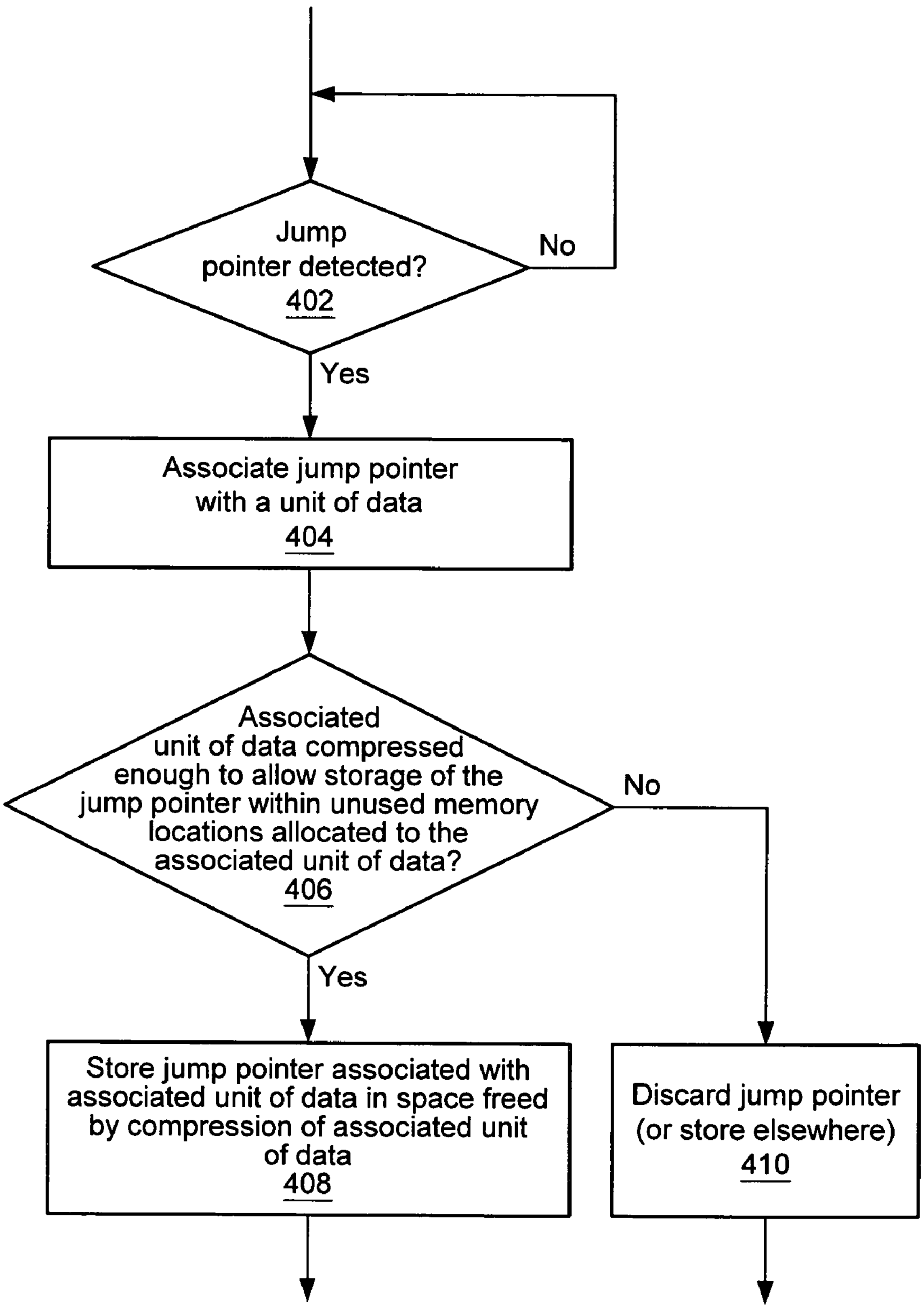
FIG. 4 is a flowchart of one embodiment of a method of storing a jump-pointer associated with a unit of data in memory space freed by compressing the unit of data.

FIG. 4 shows one embodiment of a method of detecting a jump pointer and storing the jump pointer in space freed by compressing an associated unit of data. At 402, a jump pointer is detected. The jump pointer may be detected by detecting a cache miss to an address and detecting that the address is not a fixed stride from a previously accessed address. The jump pointer points to a unit of data. At 404, the jump pointer is associated with another unit of data. The associated unit of data may be a unit of data accessed earlier than the unit of data pointed to by the jump pointer is accessed. The association may depend on execution latency and load latency. For example, if the execution latency is relatively short compared with load latency, the jump pointer may be associated with a unit of data accessed several units of data before the unit of data identified by the jump pointer.

The jump pointer is stored in unused storage locations allocated to the associated unit of data within system memory if the associated unit of data is compressed, as shown at 406–408. Note that in some situations, the associated unit of data may not be compressed enough to allow storage of the jump pointer with the associated unit of data. If the associated unit of data is not compressed at all, or if the associated unit of data is not compressed enough to allow storage of the jump pointer, the jump pointer may be discarded, as shown at 410. Alternatively, the jump pointer may be stored in a different location instead of being stored in memory space freed by compression of the associated unit of data. For example, if a microprocessor (or its associated cache hierarchy) includes storage for jump pointers, the jump pointer may be stored there instead of being stored in memory.

Figure 5:
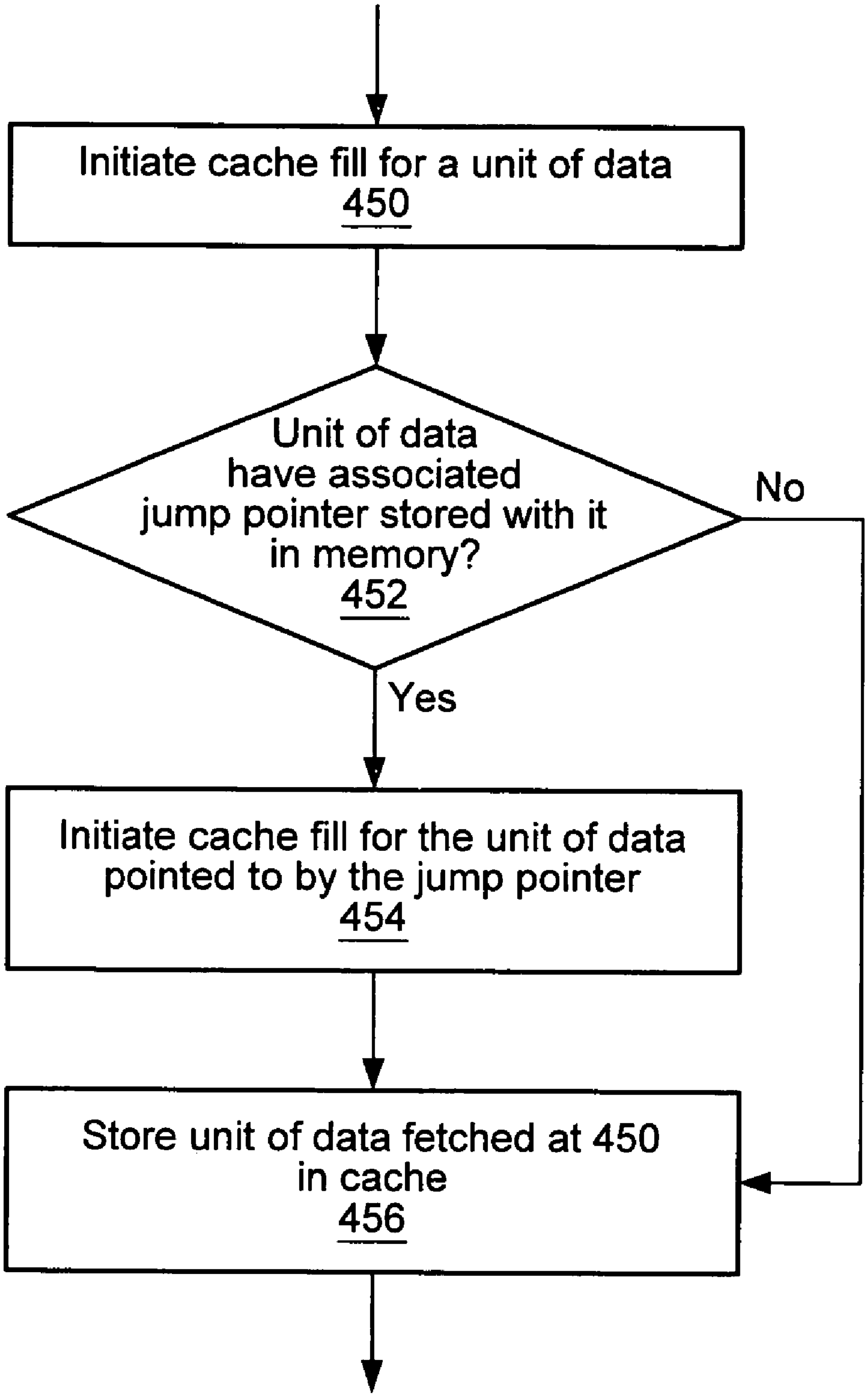
FIG. 5 is a flowchart of one embodiment of a method of using a jump-pointer associated with a unit of compressed data in a memory.

FIG. 5 shows one embodiment of a method of using a jump pointer to prefetch a unit of data in response to the unit of data with which the jump pointer is associated being accessed from memory. At 450, a cache fill for a unit of data is initiated. If the unit of data is stored in a compressed form within memory, the unit of data may be decompressed before storage in the cache. If the unit of data is compressed and an associated jump pointer is stored in memory space that would otherwise be occupied by the unit of data (i.e., if the unit of data was not compressed), the associated jump pointer may be used to initiate another cache fill, as shown at 452–454. In one embodiment, the subsequent cache fill based on the associated jump pointer may be initiated by a memory controller when the unit of data and its associated jump pointer is output from memory. The unit of data loaded from memory (at 450) is stored in the cache, as shown at 456.

Note that the functions shown in the above figures may be performed in many different temporal orders with respect to each other (e.g., in FIG. 5, the unit of data may be stored in the cache (at 454) before the cache fill for the data identified by the jump pointer is prefetched (at 456)).

Figure 6:
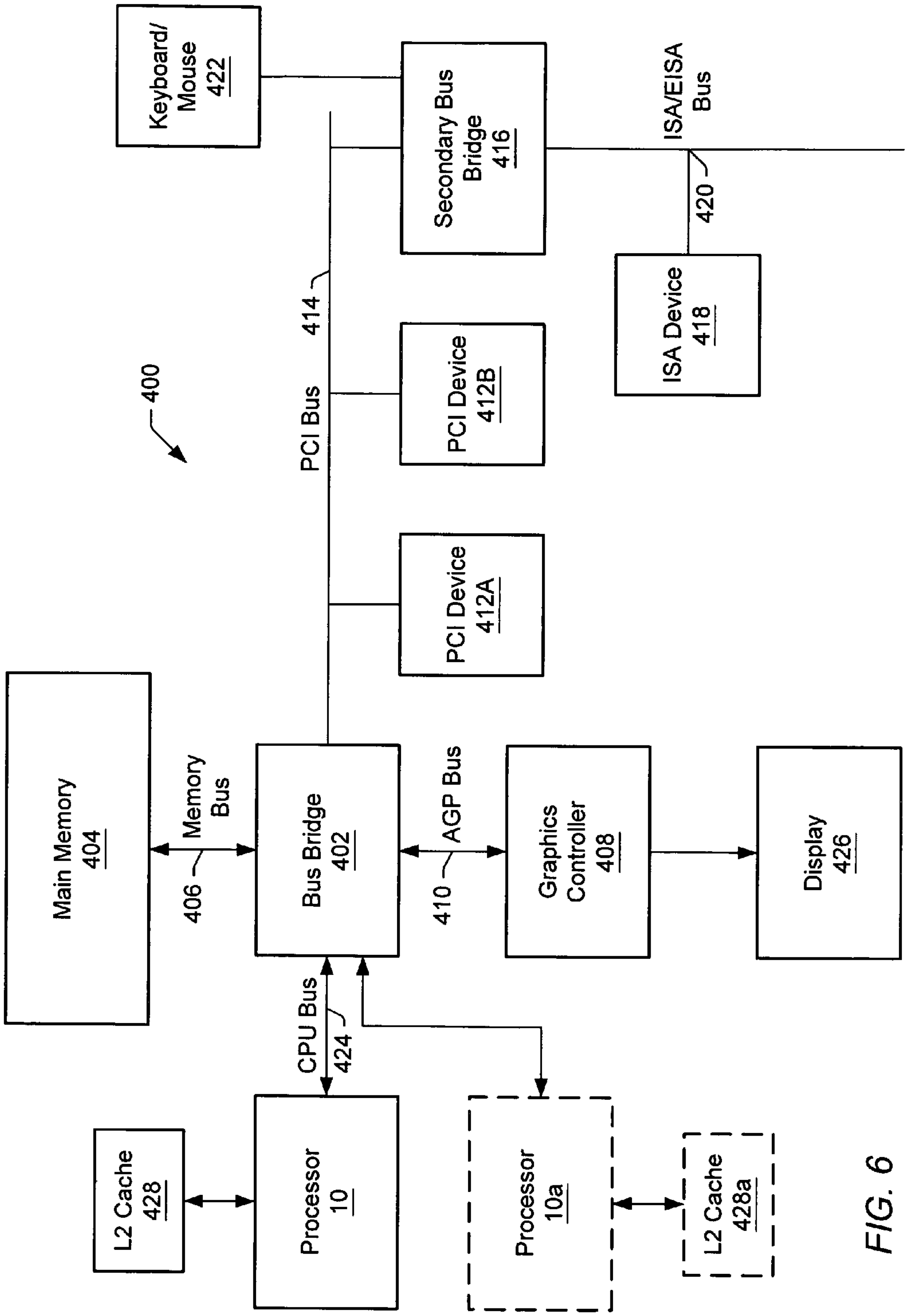
FIG. 6 is a block diagram of another embodiment of a computer system.

FIG. 6 shows a block diagram of one embodiment of a computer system 400 that includes a microprocessor 10 coupled to a variety of system components through a bus bridge 402. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Main memory 404 may store both compressed and uncompressed units of data. Main memory may store performance-enhancing information in unused storage locations allocated to the compressed units of data, as described above.

Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 10 is coupled to bus bridge 402 through a microprocessor bus 424 and to an optional L2 cache 428. In some embodiments, the microprocessor 10 may include an integrated L1 cache (not shown). The microprocessor 10 may include performance enhancement unit (e.g., a jump pointer prediction mechanism) that generates performance-enhancing data.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus. Bus bridge 402 may include a memory controller 152 and/or a compression/decompression unit 160 as described above in some embodiments. For example, bus bridge 402 may include a memory controller 152 configured to compress and/or decompress data stored in memory 404 and to cause memory 404 to store performance-enhancing data associated with compressed units of data in unused storage locations allocated to those compressed units of data. The memory controller 152 may be configured to initiate a prefetch operation if a unit of data having an associated jump pointer is accessed. In some embodiments, certain functionality of bus bridge 402, including that provided by memory controller 152, may be integrated into microprocessors 10 and 10*a*. Certain functionality included in compression/decompression unit 160 may be integrated into several devices within the computer system shown in FIG. 6 (e.g., each device that can access memory 404 may include data compression and/or decompression functionality).

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to microprocessor bus 424 between microprocessor 10 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 10. It is noted that L2 cache 428 may be separate from microprocessor 10, integrated into a cartridge (e.g., slot 1 or slot A) with microprocessor 10, or even integrated onto a semiconductor substrate with microprocessor 10.

Main memory 404 is a memory in which application programs are stored and from which microprocessor 10 primarily executes. A suitable main memory 404 includes DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 10*a* shown as an optional component of computer system 400). Microprocessor 10*a* may be similar to microprocessor 10. More particularly, microprocessor 10*a* may be an identical copy of microprocessor 10. Microprocessor 10*a* may be connected to bus bridge 402 via an independent bus (as shown in FIG. 6) or may share microprocessor bus 224 with microprocessor 10. Furthermore, microprocessor 10*a* may be coupled to an optional L2 cache 428*a* similar to L2 cache 428.

Figure 7:
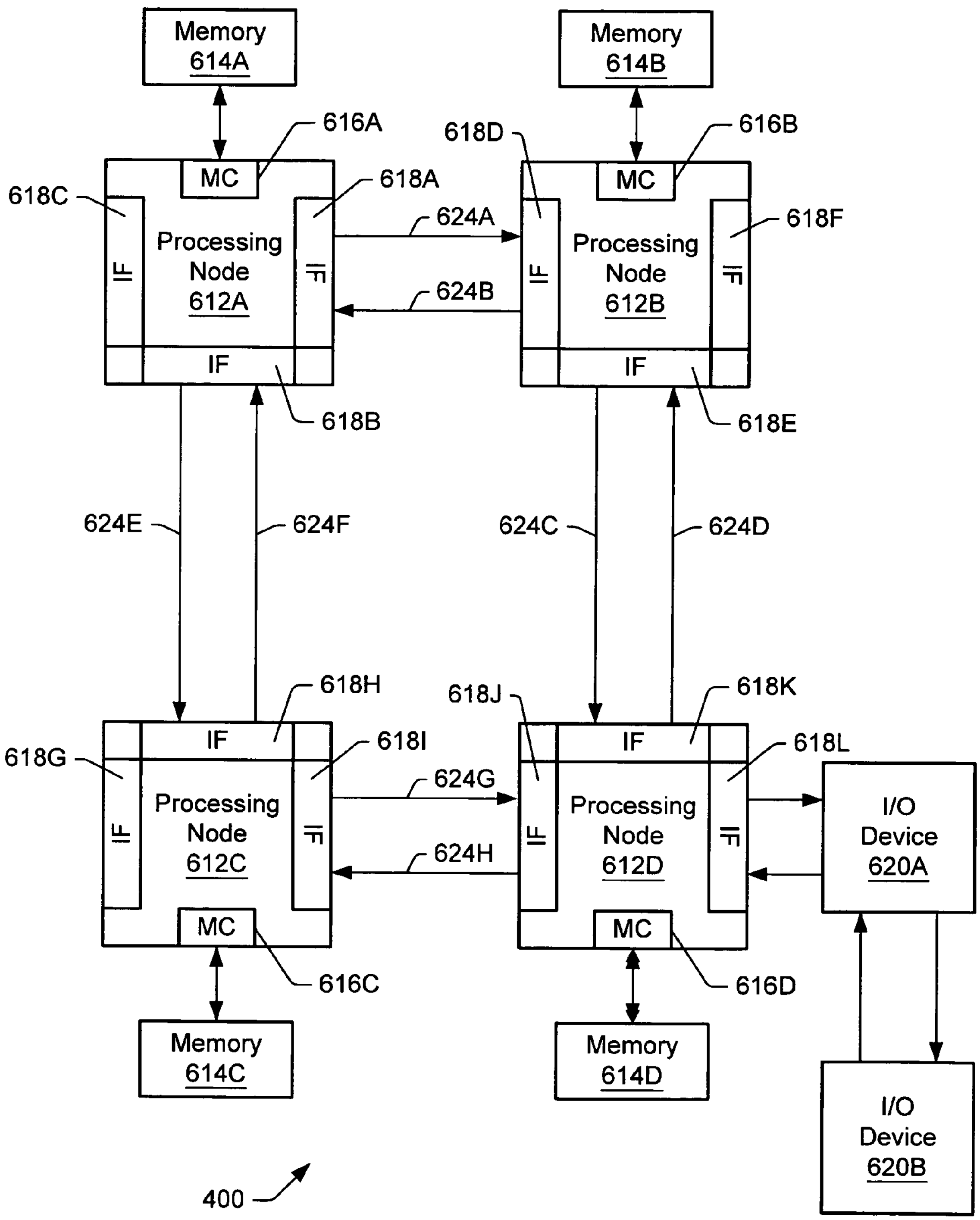
FIG. 7 is a block diagram of yet another embodiment of a computer system.

Turning now to FIG. 7, another embodiment of a computer system 400 that may include one or more memory controllers 152, compression/decompression units 160, and performance enhancement units 124, as described above, is shown. Other embodiments are possible and contemplated. In the embodiment of FIG. 7, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 6181; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes, as illustrated in FIG. 7. Generally, each set of lines 624 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C, as shown in FIG. 7. Any suitable routing algorithm may be used. Other embodiments of computer system 400 may include more or fewer processing nodes then the embodiment shown in FIG. 7.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 10 (as shown in FIG. 6). External interface unit 18 may includes the interface logic 618 within the node, as well as the memory controller 616. Each memory controller 616 may include an embodiment of memory controller 152, as described above.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A system, comprising:

a memory controller; and a memory coupled to the memory controller;

wherein the memory controller is configured to allocate a plurality of storage locations within the memory to store a unit of data, wherein the unit of data is compressed, and wherein the unit of data does not occupy a portion of the plurality of storage locations that would otherwise be occupied by the unit of data if the unit of data was not compressed;

wherein the memory controller is configured to store performance-enhancing data associated with the unit of data in the portion of the plurality of storage locations;

wherein in response to a request for the unit of data from a functional unit, the memory controller is configured to cause both the unit of data and the performance-enhancing data associated with the unit of data to be returned to the functional unit, wherein retrieval of the unit of data from the memory does not depend on retrieval of the performance-enhancing data associated with the unit of data from the memory.

2. The system of claim 1, wherein the memory controller is configured to allocate a same number of storage locations to both compressed and uncompressed units of data.

3. The system of claim 1, wherein the performance-enhancing data stored in the portion of the plurality of storage locations is compressed.

4. The system of claim 1, further comprising a mass storage device and a decompression unit, wherein the decompression unit is configured to decompress units of data written to the mass storage device from the memory.

5. The system of claim 1, further comprising a mass storage device and a compression unit, wherein the compression unit is configured to compress units of data written to the memory from the mass storage device.

6. The system of claim 1, further comprising:

a decompression unit coupled to the memory, wherein the functional unit is configured to operate on the unit of data, wherein the memory controller is configured to cause the memory to output the unit of data to the decompression unit in response to receiving the request for the unit of data from the functional unit, and wherein the decompression unit is configured to decompress the unit of data and to output the decompressed unit of data to the functional unit.

7. The system of claim 6, wherein the decompression unit is further configured to provide the performance-enhancing data associated with the unit of data to the functional unit.

8. The system of claim 6, wherein the decompression unit is integrated with the functional unit.

9. The system of claim 6, wherein the performance-enhancing data includes prefetch data, wherein in response to receiving the performance-enhancing data from the memory, the memory controller is configured to use the prefetch data to request data identified by the prefetch data from the memory.

10. The system of claim 9, wherein the performance-enhancing data includes a jump-pointer to another unit of data stored in the memory.

11. The system of claim 1, wherein the memory controller is further configured to store at least a portion of another unit of data in the portion of the plurality of storage locations.

12. The system of claim 1, wherein the memory controller is configured to store status data indicating that the unit of data is compressed in the plurality of storage locations allocated to the unit of data.

13. The system of claim 12, wherein the status data is encoded as an unused ECC (Error Correcting Code) code pattern.

14. The system of claim 12, wherein the status data indicates whether the plurality of storage locations allocated to the unit of data currently store performance-enhancing data.

15. A system, comprising:

a memory controller; and a memory coupled to the memory controller;

wherein the memory controller is configured to allocate a plurality of storage locations within the memory to store a unit of data, wherein the unit of data is compressed, and wherein the unit of data does not occupy a portion of the plurality of storage locations that would be otherwise be occupied by the unit of data if the unit of data was not compressed;

wherein the memory controller is configured to store performance-enhancing data associated with the unit of data in the portion of the plurality of the storage locations; and a plurality of microprocessors, wherein the performance-enhancing data includes directory information associated with the unit of data, wherein the directory information indicates which of the plurality of microprocessors currently has the unit of data in a particular coherence state.

16. The system of claim 1, wherein the memory controller is configured to overwrite the performance-enhancing data stored in the portion of the plurality of storage locations with a less-compressible version of the unit of data in response to the unit of data becoming less compressible.

17. The system of claim 16, wherein the memory controller is configured to copy the performance-enhancing data to another set of storage locations before overwriting the performance-enhancing data stored in the portion of the plurality of storage locations.

18. The system of claim 1, wherein the memory controller is configured to access the memory as a set of variable-length units of data.

19. A method, comprising:

compressing an uncompressed unit of data into a compressed unit of data, wherein said compressing frees a portion of a memory space of a memory required to store the uncompressed unit of data;

storing performance-enhancing data associated with the compressed unit of data in the portion of the memory space;

a functional unit requesting the uncompressed unit of data from the memory;

the memory outputting the compressed unit of data and the performance-enhancing data in response to said requesting, wherein the memory outputting the compressed unit of data does not depend upon the memory outputting the performance-enhancing data; and decompressing the compressed unit of data into the uncompressed unit of data in response to said outputting.

20. The method of claim 19, further comprising overwriting the performance-enhancing data stored in the portion of the memory space with the compressed unit of data in response to the compressed unit of data becoming less compressible.

21. The method of claim 19, wherein the performance-enhancing data comprises a jump-pointer associated with the compressed unit of data.

22. The method of claim 21, further comprising associating the jump pointer with the compressed unit of data based on an equivalence class and least recently used state of the unit of data.

23. The method of claim 19, further comprising allocating a same amount of memory space to the compressed unit of data as allocated to an uncompressed unit of data.

24. The method of claim 19, wherein the performance-enhancing data stored in the portion of the memory space is compressed.

25. The method of claim 19, further comprising copying the compressed unit of data to a mass storage device, wherein said copying comprises decompressing the unit of data into the uncompressed unit of data and not copying of the performance-enhancing data to the mass storage device.

26. The method of claim 19, wherein said compressing is performed when the uncompressed unit of data is read from a mass storage device to a system memory.

27. A method, comprising:

compressing an uncompressed unit of data into a compressed unit of data, wherein said compressing frees a portion of a memory space required to store the uncompressed unit of data;

storing performance-enhancing data associated with the compressed unit of data in the portion of the memory space, wherein the performance-enhancing data includes prefetch data; and using the prefetch data to request a second unit of data from a memory in response to the compressed unit of data being accessed.

28. The method of claim 19, further comprising storing at least a portion of another unit of data in the portion of the memory space.

29. The method of claim 19, further comprising indicating whether the portion of the memory space stores any performance-enhancing data.

30. A method, comprising:

compressing an uncompressed unit of data into a compressed unit of data, wherein said compressing frees a portion of a memory space required to store the uncompressed unit of data;

storing performance-enhancing data associated with the compressed unit of data in the portion of the memory space;

wherein the performance-enhancing data includes directory information associated with the compressed unit of data, wherein the directory information indicates whether any of a plurality of microprocessors has the compressed unit of data in a particular coherence state.

31. The method of claim 19, further comprising copying the compressed unit of data and the performance-enhancing data to a mass storage device.

32. A system, comprising:

means for generating performance-enhancing data associated with a unit of data;

means for compressing the unit of data into a compressed unit of data, wherein compressing the unit of data frees a portion of a memory space required to store the unit of data;

means for storing the performance-enhancing data associated with the unit of data in the portion of the memory space freed by compressing the unit of data; and means for causing both the unit of data and the performance-enhancing data associated with the unit of data to be returned to a functional unit in response to a request for the unit of data from the functional unit, wherein retrieval of the unit of data from the memory space does not depend on retrieval of the performance-enhancing data associated with the unit of data from the memory space.

33. A system comprising

A memory controller; and

A memory coupled to the memory controller;

Wherein the memory controller is configured to allocate a plurality of storage locations within the memory to store a unit of data, wherein the unit of data is compressed, and wherein the unit of data does not occupy a portion of the plurality of storage location that would otherwise be occupied by the unit of data if the unit of data was not compressed;

Wherein the memory controller is configured to store performance-enhancing data associated with the unit of data in the portion of the plurality of storage locations;

Wherein the performance-enhancing data includes prefetch data; and

Wherein the prefetch data is being used for requesting a second unit of data from the memory in response to the compressed unit of data being accessed.

* * * * *